United States Patent
Dausinger et al.

(10) Patent No.: US 6,215,094 B1
(45) Date of Patent: Apr. 10, 2001

(54) PROCESS FOR DETERMINING THE INSTANTANEOUS PENETRATION DEPTH AND A MACHINING LASER BEAM INTO A WORKPIECE, AND DEVICE FOR IMPLEMENTING THIS PROCESS

(75) Inventors: Friedrich Dausinger, Stuttgart; Juergen Griebsch, Steinenbronn; Ruediger Hack, Dettingen, all of (DE)

(73) Assignee: Universitat Stuttgart (DE)

( * ) Notice: Subject to any disclaimer, the term of this patent is extended or adjusted under 35 U.S.C. 154(b) by 0 days.

(21) Appl. No.: 08/619,599

(22) PCT Filed: Sep. 24, 1994

(86) PCT No.: PCT/EP94/03190

§ 371 Date: May 28, 1996

§ 102(e) Date: May 28, 1996

(87) PCT Pub. No.: WO95/09713

PCT Pub. Date: Apr. 13, 1995

(30) Foreign Application Priority Data

Oct. 1, 1993 (DE) .................................................. 43 33 501

(51) Int. Cl.$^7$ .................................................. B23K 26/00
(52) U.S. Cl. .................................. 219/121.62; 219/121.83
(58) Field of Search .................... 219/121.61, 121.62, 219/121.63, 121.64, 121.7, 121.71, 121.76, 121.83

(56) References Cited

U.S. PATENT DOCUMENTS

| | | | |
|---|---|---|---|
| 4,121,087 | * 10/1978 | Malmuth et al. | 219/121.62 |
| 4,777,341 | * 10/1988 | Steen et al. | 219/121.83 |
| 4,789,770 | 12/1988 | Kasner et al. | 219/121.67 |
| 4,845,354 | * 7/1989 | Gupta et al. | 219/121.62 X |
| 4,865,683 | * 9/1989 | Burns | 219/121.61 X |
| 4,952,770 | 8/1990 | Hayashi | 219/121.67 |
| 5,359,203 | * 10/1994 | Hashii et al. | 219/121.64 X |

FOREIGN PATENT DOCUMENTS

| | | | |
|---|---|---|---|
| 25 38 660 | 3/1976 | (DE) . | |
| 37 10 816 | 10/1988 | (DE) . | |
| 4039303 | * 6/1992 | (DE) | 219/121.83 |
| 2-92482 | * 4/1990 | (JP) | 219/121.83 |
| 3-124387 | * 5/1991 | (JP) | 219/121.62 |
| 92 14578 | 9/1992 | (WO) . | |

OTHER PUBLICATIONS

Dowden et al., "An analysis of the laser–plasma interaction in laser keyhole welding," J. Phys. D: Appl. Phys. 22 (1989), pp. 741–749.*

"Laser und Optoelektronik" Bd. 21, No. 3, Jun. 1989, pp 69–72.

* cited by examiner

Primary Examiner—Samuel M. Heinrich

(57) ABSTRACT

The penetration depth of a machining laser beam into workpiece is continuously monitored in that a measuring laser beam is directed onto the vapor capillary that is generated in the workpiece by the machining laser beam. The portion of the measuring laser beam that re-emerges from the vapor capillary is monitored by a sensor whose output signal is then used to bring about (producing holes) or to adjust (welding or superficial re-melting of a workpiece) the desired penetration depth defined by a preselected reference signal

8 Claims, 2 Drawing Sheets

PROCESS FOR DETERMINING THE INSTANTANEOUS PENETRATION DEPTH AND A MACHINING LASER BEAM INTO A WORKPIECE, AND DEVICE FOR IMPLEMENTING THIS PROCESS

CROSS-REFERENCES TO RELATED APPLICATIONS (Not applicable)

STATEMENT REGARDING FEDERALLY SPONSORED RESEARCH OR DEVELOPMENT (Not applicable)

The invention relates to a process for determining the instantaneous penetration depth and achieving a desired penetration depth of a machining laser beam into a workpiece and a device for implementing the process.

Laser beams are used for machining workpieces in the widest variety of ways, such as superficial re-melting, producing welded joints or introducing holes. In all these cases it is very important to detect the depth of penetration of the laser beam into the workpiece and ensure that it reaches the desired value and optionally keeps it constant. In welded joints this is important, for example, because on the one hand the welding melt has to reach sufficiently far into the parts to be joined together, so that the parts are reliably joined, but also because on the other hand the weld should not emerge from the undermost part, which could cause damage to visible surfaces. This applies, for example, to the welding of sheets of metal that are used as body parts in motor vehicle construction.

In the past, in laser welding the correct penetration depth was substantially verified on the basis of random samples, by producing polished sections on completed workpieces. This process is relatively costly, however, because a penetration depth that is inadequate or too deep is not ascertained until waste has already been produced.

DISCUSSION OF RELEVANT ART

A process is known from DE-OS 37 10 816 in which the quality of a laser machining process on a workpiece is monitored by observing the laser light reflected at the workpiece. No relationship is established between the penetration depth of the laser beam and the reflected portion of the laser beam, however; irregular changes in the intensity of the reflected laser light are simply interpreted as deviations from the desired operating conditions of the machining laser beam.

EP-A-0 299 702 describes a process in which the depth of a hole produced by a laser beam in a laminate structure is monitored by means of the laser irradiation reflected in the hole. In this case, however, the differing reflectivity of the different materials contained in the laminate structure is exclusively utilized; the sudden change of the reflected portion of the laser light is identified with the reaching of a new boundary layer inside the laminate. This known process is not suitable for monitoring the penetration depth of a laser beam in a uniform material.

A process and a device of the above-mentioned kind are described in DE-A-25 38 660. In this case the criterion for the depth of the vapour capillary produced by the machining laser beam is the absorption of the laser beam which it experiences when passing through the vapour present in the vapour capillary. The results obtained in this way are, however, relatively difficult to reproduce because they depend on the nature of the vapour discharge; furthermore this process and/or this device cannot be universally used in cases where there is no notable absorption of the machining laser beam in the vapour produced when machining.

WO-A-92 14 578 describes a process for monitoring the laser machining of workpieces in which the optical and/or acoustic signals resulting from the plasma or vapour created by the laser are detected and conclusions are drawn about the progress of the machining process from them.

Pages 69–71 of the June 1989 edition of "Laser und Optoelektronik" describe a process in which optical signals are detected in the near-UV range and at the wavelength of the machining laser. In this case the main purpose of detecting the IR signal is to obtain a better understanding of the principles of the mechanisms of interaction between laser beam and workpiece. This IR signal is not interpreted in the sense of using it as a measured variable for the weld depth.

SUMMARY OF THE INVENTION

The object of the invention is to develop a process of the above-mentioned kind in such a way that the penetration depth can be continuously monitored in the course of the machining process and can be brought to the desired value, including in uniform materials.

According to the invention this object is achieved by means of the following process:

a) directing a laser beam performing the function of a measuring laser beam onto a vapour capillary formed in the workpiece by a laser beam performing the function of a machining laser beam;

b) determining a portion of the laser beam performing the function of a measuring laser beam that re-emerges from the vapour capillary;

c) in step b) determining the percentage portion of the laser beam performing the function of a measuring laser beam that actually re-emerges at the workpiece and is not introduced into the workpiece; and d) determining enery introduced into the workpiece per unit of time and area by the laser beam performing the function of a measuring laser beam that was determined in step b).

The process according to the invention is based on the knowledge that there is an unequivocal functional relationship between the percentage portion of a laser beam directed at the vapour capillary, which portion is reflected i.e., re-emergers from the vapour capillary, and the penetration depth of the laser beam, i.e. the depth of the vapour capillary. It is highly likely that this functional relationship is based on the mechanism of the multiple reflections within the vapour capillary; according to this model, curves can be calculated which reflect the relationship between the percentage reflected portion of the laser beam and the aspect, i.e. the relationship between depth and surface area of the hole. Such curves can also be determined experimentally by means of corresponding trials in which the reflected laser beam portion is determined point by point in each case at a certain aspect.

In the simplest case the same laser is used to generate the machining laser beam and the measuring laser beam. It is quite evident that in this case the construction will be the least complex in terms of apparatus and the costs at their lowest. This variant of the process according to the invention has the following disadvantage, however: for reasons of economy the highest possible percentage (over 90%) of the energy provided by the machining laser should be introduced into the workpiece. At this high input of the machining laser beam that is important to the efficiency of the process, however, the characteristic curve which produces the relationship between depth of the vapour capillary and reflected percentage portion of the laser beam is relatively flat, so that the determination of the penetration depth is relatively insensitive.

If the sensitivity of the measuring process when a single laser is used is not sufficient in some applications, therefore, use can be made of the physical phenomenon according to which the more slowly the characteristic curves pass into a flat region, the greater the wavelength of the laser beam used for the measurement. In this case a process variant is recommended in which two different lasers are used to generate the machining laser beam and the measuring laser beam, wherein the wavelength of the measuring laser beam is greater than that of the machining laser beam. In this way the measuring laser beam can be operated independently of the machining laser beam set to the highest possible efficiency in a manner in which the measuring sensitivity is high.

The process according to the invention can be used, for example, to achieve a hole with a certain depth in a workpiece. In this case its form is such that a) a preliminary trial determines the percentage portion of the measuring laser beam that is reflected at the workpiece at the desired depth of the hole;

b) the reflected percentage portion of the measuring laser beam is monitored continuously while the machining laser beam is making the hole with the workpiece stationary and the machining laser beam is interrupted when the reflected percentage portion of the measuring laser beam has reached the value determined in the preliminary trial.

As the depth of the hole increases, the reflected portion of the measuring laser beam decreases until it corresponds to the previously determined desired value on reaching the desired depth.

The process according to the invention can also be used to melt open a workpiece to a certain depth or to introduce a weld in a workpiece to a certain depth. The process according to the invention is then characterized in that a) a preliminary trial determines the percentage portion of the measuring laser beam that is reflected at the workpiece at the desired depth of the melt;

b) the reflected percentage portion of the measuring laser beam is monitored continuously while the melt is being produced by the machining laser beam with a relative movement between machining laser beam and workpiece and deviations between the instantaneous reflected percentage portion of the measuring laser beam and the value determined in the preliminary trial are corrected by adjustment of the energy introduced into the workpiece by the machining laser beam per unit of time and area.

In this process variant, therefore, a genuine control loop is provided which continuously ensures that the melt depth always corresponds to the desired value while the workpiece is moving.

In a development of this process the adjustment is achieved by changing the average power of the machining laser beam.

Alternatively it is also possible to undertake this adjustment by changing the relative speed between machining laser beam and workpiece. If the energy of the machining laser beam introduced per unit of time and area is to be reduced, the relative speed between workpiece and laser beam is increased; to increase the energy of the machining laser beam introduced into the workpiece per unit of time and area, in contrast the relative speed between machining laser beam and workpiece is reduced.

Finally it is also possible for the adjustment to take place by de-focusing the machining laser beam.

A further object of the invention is to create a device for implementing the above-mentioned process with which the penetration depth of the laser beam can be continuously detected and brought to a desired value.

According to the invention this object is achieved by a device having a laser performing the function of a machining laser, whose laser beam generates a vapour capillary in a workpiece to be machined; a control unit with which the energy introduced into the workpiece by the laser beam performing the function of a machining laser beam per unit of time and area can be changed; a sensor that detects a portion of a laser beam performing the function of a measuring laser beam that re-emerges from the vapour capillary and generates a corresponding output signal; a reference signal source that generates a reference signal that corresponds to the portion of the laser beam performing the function of a measuring laser beam that re-emerges from the vapour capillary at a desired penetration depth (S) of the laser beam performing the function of a machining laser beam; and a comparator that compares the output signal of the sensor with the reference signal and supplies an output signal that acts on the control unit. The sensor determines the percentage portion of the laser beam performing the function of a measuring laser beam that actually re-emerges at the workpiece and is not introduced into the workpiece.

The device according to the invention is based on the same physical principles as were described above with respect to the process according to the invention. The advantages of the device according to the invention also coincide by analogy with the above-mentioned advantages of the process according to the invention.

The least expensive development of the device according to the invention, and the simplest from the point of view of apparatus, is that in which a single laser is provided, the beam of which serves as both machining and measuring laser beam.

For the reasons already explained above the measuring accuracy can be improved by means of a device in which two different lasers are provided, the first of which generates the machining laser beam and the second the measuring laser beam, wherein the wavelength of the measuring laser beam is greater than that of the machining laser beam.

In principle the source of the reference signal is immaterial, provided that it is simply capable of representing a desired value for the penetration depth. In the simplest case the reference signal source could be a voltage source whose output voltage is empirically set to the desired value.

In a preferred embodiment of the invention the reference signal source comprises a memory in which a value determined in a preliminary trial can be stored, which value corresponds to the reflected percentage portion of the measuring laser beam at a desired penetration depth of the machining laser beam.

This design principle can be taken to the extent that a curve which reproduces the functional relationship between the penetration depth of the machining laser beam and the reflected percentage portion of the measuring laser beam is stored in the memory. Following corresponding calibration by means of preliminary trials it is then possible to call up from the memory that particular point on the curve that corresponds to a penetration depth of the laser desired in the individual case.

The device according to the invention can be used to produce holes. It is then formed in such a way that a) the workpiece is rigidly positioned with respect to the machining laser beam;
b) the comparator produces an output signal when the output signal of the sensor corresponds to the reference signal;
c) the control unit interrupts the machining laser when the output signal from the comparator is received.

There is also a wide field of application for those devices with which the workpiece can be melted open to a certain depth or a weld can be introduced into a workpiece to a certain depth. Such devices are characterized in that a) a device is provided which produces a relative movement between the workpiece and the machining laser beam;
b) the comparator produces an output signal which is representative of the deviation between the output signal of the sensor and the reference signal;
c) the control unit comprises an adjustment device which resets the output signal of the comparator to zero by changing the energy introduced into the workpiece per unit of time and area by the machining laser beam.

The average energy introduced can be changed in three different ways:

Either the control unit influences the speed of the relative movement between workpiece and machining beam or the control unit influences the power of the machining laser beam. The third possibility lies in the fact that the control unit influences the focusing of the machining laser beam.

BRIEF DESCRIPTION OF THE DRAWINGS

Embodiments of the invention are explained in greater detail below with the aid of the drawing, in which.

DETAILED DESCRIPTION OF PREFERRED EMBODIMENTS

Figure 1:
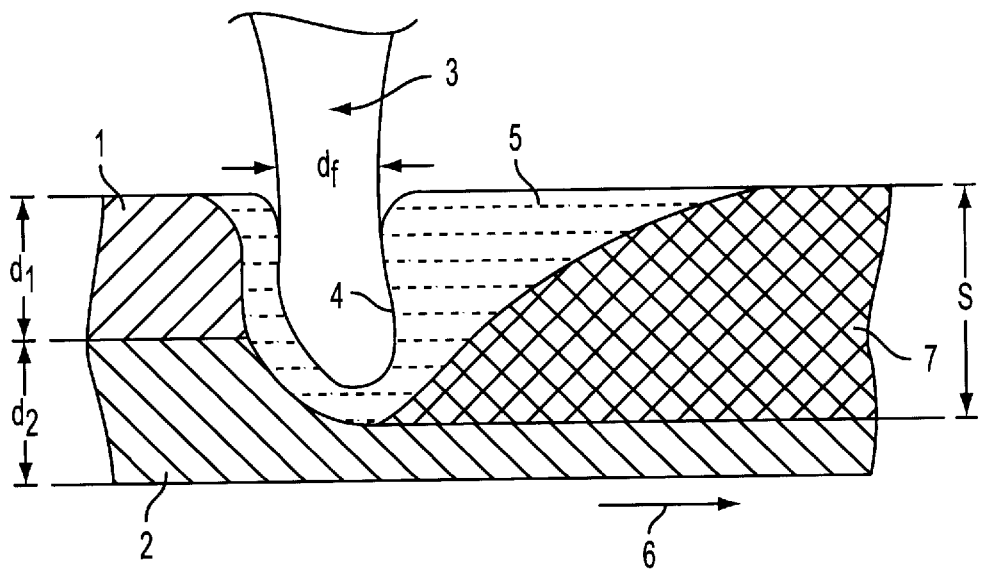
FIG. 1 shows a section through two superimposed sheets of metal while they are being welded by means of a machining laser beam.

FIG. 1 shows two superimposed sheets of metal 1, 2 in section. A vapour capillary 4 with a certain diameter df is formed in the material of the sheets of metal 1, 2 by means of a machining laser beam 3 impinging substantially perpendicularly on the upper sheet 1. The vapour capillary 4 extends completely through the sheet 1 but only partially through the sheet 2. It is surrounded by a melt 5.

The superimposed sheets 1 and 2 are moved through under the machining laser beam 3 in the direction of the arrow 6. The depth s of the melt 5, measured from the upper side of the upper sheet 1, is only slightly larger than the depth of the vapour capillary 4; it can therefore be approximately equated to it.

The melt 5 begins to solidify at a certain distance from the laser beam 3; the solidified material is marked in FIG. 1 by means of cross-hatching and provided with the reference numeral 7.

In practice it is important on the one hand to ensure an adequate weld depth s so that the two sheets 1, 2 are reliably joined together. On the other hand the weld may not emerge from the lower surface of the lower sheet 2 as otherwise the surface quality of the workpiece produced from the two sheets 1, 2 would suffer. In other words, it must be reliably ensured that the weld depth s is definitely larger than the thickness $d_1$ of the sheet 1 but also reliably smaller than the sum of the thicknesses $d_1+d_2$ of the sheets 1 and 2.

Use is made of the following physical considerations in order to guarantee this in practice:

The energy input of the machining laser beam 3 into the material of the sheets of metal 1 and 2 is a function of the aspect, i.e. of the ratio s/df, of the vapour capillary 4. On the assumption that the dependence of the energy input on the aspect is based on a multiple reflection of the laser beam 3 in the vapour capillary 4, the energy input can be calculated as a function of the aspect; curves are produced, as are shown qualitatively in FIG. 2 for two different wavelengths $\lambda_1$ and $\lambda_2 > \lambda_1$. These curves are all characterized in that the energy introduced into the material of the workpiece initially rises sharply with increasing aspect, but then turns round and approaches the 100 per cent line substantially asymptotically. The steepness of this rise (with parameters otherwise unchanged) depends on the degree of absorption, i.e. on the wavelength of the laser light among other things: at larger wavelengths the rise of the curve and the approach to the horizontal asymptote takes place more slowly.

Figure 2:
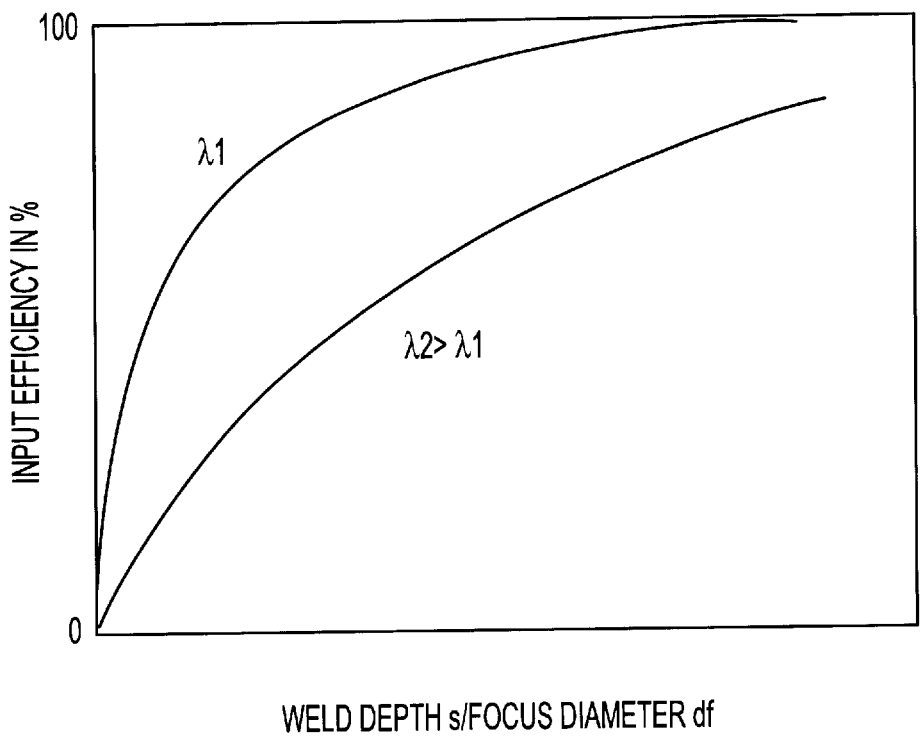
FIG. 2 shows characteristic curves which represent the dependence of the degree of input of the laser energy (in per cent) on the aspect of the vapour capillary produced by the machining laser beam.

The curves shown in FIG. 2 for the energy input can also be read as curves which show the reflected portion of the laser energy in each case: inputted and reflected energy add up to 100% in each case. This shows that information about the depth of the vapour capillary 4 and hence substantially about the depth s of the melt 5 can be obtained by measuring the percentage portion of the laser energy reflected at the workpiece.

For the particular material and laser used, curves as are shown in FIG. 2 can be plotted experimentally for the practical utilization of the knowledge described above. Different samples of the material to be welded are melted open to different depths and the reflected portion of the laser light is recorded. The melt depth s is determined quantitatively by means of a polished section in each case. Quantitative curves, corresponding to FIG. 2, can be determined point by point in this way for each concrete application.

Figure 3:
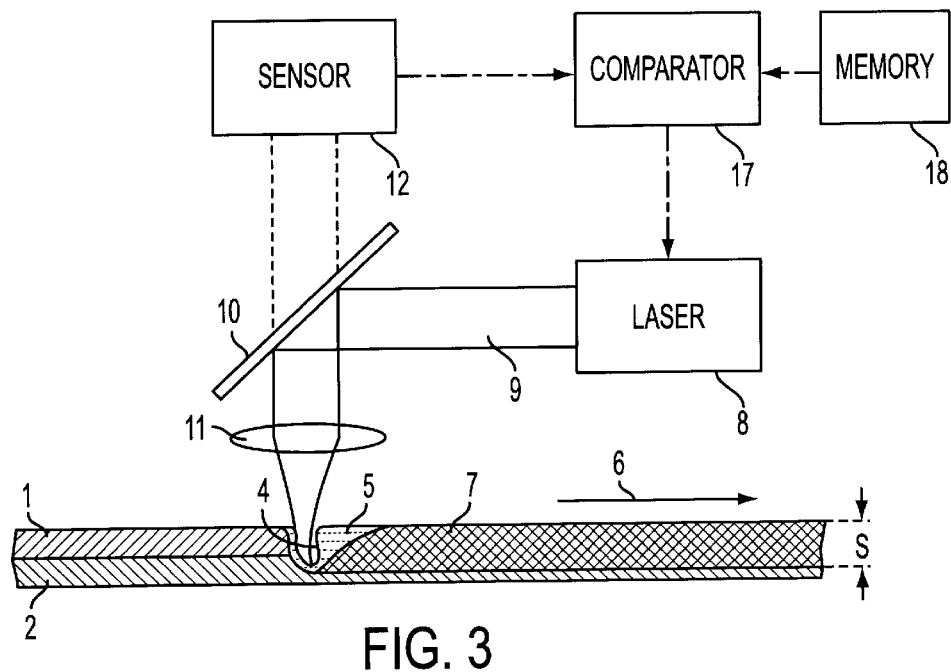
FIG. 3 is a diagrammatic view of a first embodiment of a device for welding two sheets of metal.

FIG. 3 shows a first embodiment of a device with which a controlled weld depth can be achieved. The device comprises a laser 8, whose laser beam 9 is directed onto the workpiece comprising the two sheets of metal 1 and 2 via a beam splitter 10 (semi-reflecting mirror) and a focusing optics 11. In the sheets 1, 2 the focused laser beam 9 generates a vapour capillary 4 surrounded by a melt 5, as shown in FIG. 1 and described above. When the workpiece formed from the sheets 1, 2 moves in the direction of the arrow 6, a weld formed by the solidified material 7 and whose depth is s is produced.

To set this weld depth s and keep it constant, use is made of the fact that the percentage energy input of the laser beam 9 into the sheets 1 and 2 is a function of the weld depth s, as previously determined experimentally and stored in a memory 18 as a curve according to FIG. 2. The reflected intensity of the laser beam which corresponds to the percentage energy input in question is determined by a sensor 12 which is arranged behind the semi-reflecting mirror 10 in the rearward extension of the laser beam 9 impinging on the workpiece. The output signal of the sensor 12 which is proportional to the reflected laser intensity is supplied to a comparator 17 and compared there with that value of the curve stored in the memory 18 which corresponds to the desired weld depth S.

The output signal of the comparator 17 is supplied to the control unit of the laser 8 with which the laser output power can be changed.

The mode of operation of the device shown in FIG. 3 is therefore as follows:

The sheets of metal 1 and 2, mounted on a coordinate table for example, are moved forwards under the device in the direction of the arrow 6, wherein the laser beam 9 melts the material of the sheets 1 and 2 open and leaves behind a weld seam of solidified material 7. In the course of welding the sensor 12 determines the percentage portion of the reflected laser energy. If this is larger than the value of the curve stored in the control 8 and corresponding to the desired value of the weld depth s, this means that too little energy of the laser beam is being introduced into the workpiece, and so the vapour capillary 4 and hence the weld depth s is too small. By increasing the power of the laser 8 or by reducing the feed speed of the workpiece the energy input is now increased until the desired weld depth s is reached. The output signal of the sensor 12 then corresponds to the desired value stored in the memory 18. No further changes to the average laser power or the feed speed now take place.

If, on the other hand, the output signal of the sensor 12 is smaller than the value of the curve stored in the memory 18, which value corresponds to the desired weld depth s, this means that too much energy of the laser beam 9 is being introduced into the workpiece, i.e. that the weld depth s is too large. The energy input in the unit of time from the laser beam 9 is now reduced, by reducing the laser power or by increasing the feed speed of the workpiece, for example, until the reduction in the energy input achieved in this way causes the output signal of the sensor 12 again to correspond to the desired value on the curve stored in the memory 14.

Figure 4:
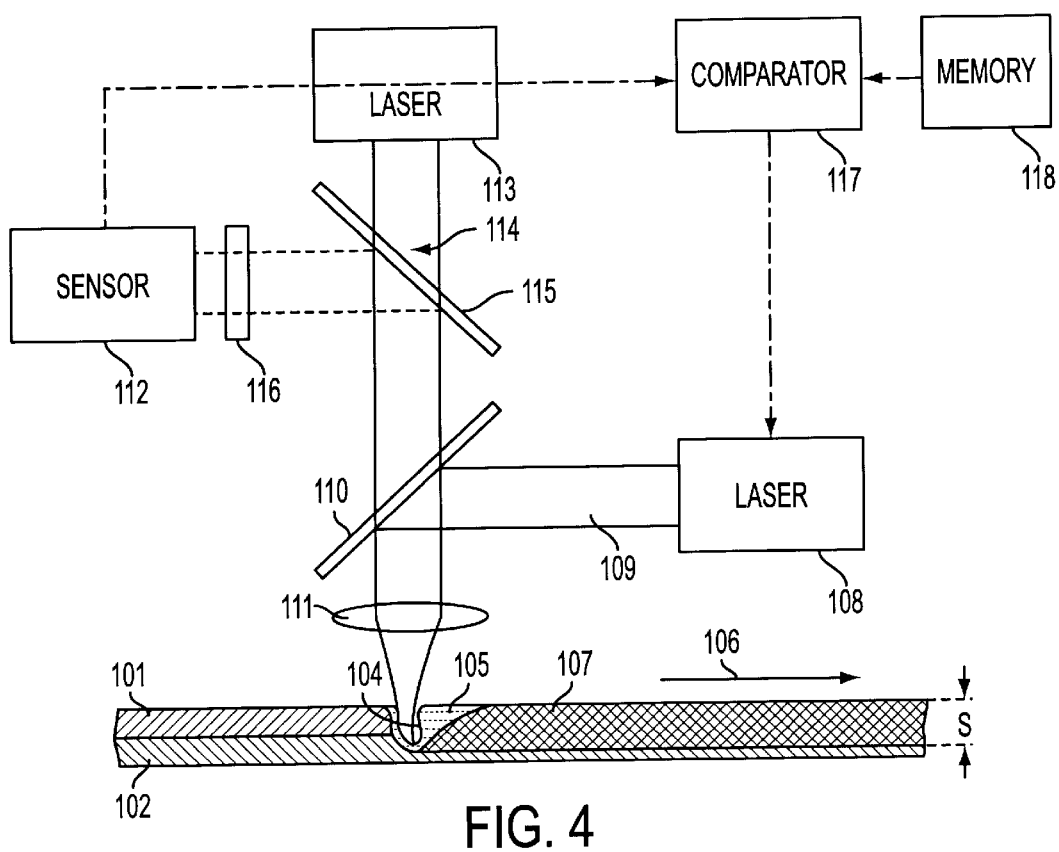
FIG. 4 shows a second embodiment of a device for welding two sheets of metal.

For reasons of energy saving, it is of course desirable for as much of the laser energy as possible to be introduced into the workpiece. In this connection, if the characteristic curves of the energy input are viewed as a function of the aspect, as they are shown in FIG. 2, it will be noted that the curve is relatively flat in the desirable range of high energy input. In other words, in unfavourable circumstances the reflected portion of the laser beam can be a relatively insensitive function of the weld depth s. In this case a device like the one illustrated in FIG. 4 is recommended. In many respects this device corresponds to the one that has already been described with the aid of FIG. 3; corresponding parts are therefore identified with the same reference numerals plus 100.

The workpiece to be machined and shown in FIG. 4 is likewise two superimposed sheets of metal 101, 102 which are moved forwards in the direction of the arrow 106. A first laser 108, denoted "machining laser" below, emits a first laser beam 109, denoted "machining laser beam" below. The machining laser beam 109 is deflected through 90° by means of a first beam splitter (semi-reflecting mirror) 110 so that it impacts on the upper sheet 101 approximately perpendicularly. Again there is a focusing optics 111 between the first beam splitter 110 and the workpiece surface.

In the sheets 101 and 102 the machining laser beam 109 produces a vapour capillary 104 which is surrounded by a melt 105 and as the workpiece passes by it leaves behind a weld seam formed from solidified material 107, exactly as was the case in the embodiment of FIG. 3.

A second laser 113, denoted "measuring laser" below, is arranged perpendicularly above the workpiece formed from the sheets 101 and 102. The measuring laser 113 emits a second laser beam 114, denoted "measuring laser beam" below and whose wavelength $\lambda_2$ is larger than the wavelength $\lambda_1$ of the machining laser beam 109. The measuring laser beam 114 passes through a second beam splitter 115, set at an angle of approx. 45°, the first beam splitter 110 and is reproduced on the vapour capillary 104 by the focusing optics 111 in the same way as the machining laser beam 109 also. This means that at the workpiece the measuring laser beam 114 "sees" the same geometrical conditions as the machining laser beam 109.

A characteristic curve which rises considerably more slowly than that of the machining laser beam 109, as can be seen qualitatively from FIG. 2, now applies to the percentage energy input of the measuring laser beam 114 into the workpiece comprising sheets 101 and 102. The measuring laser 113, whose power can be very much lower than that of the welding laser 108, can therefore be operated in a range of the characteristic curve in which the change in the energy input with the weld depth s is still relatively large so that the percentage reflected portion of the measuring laser beam 114 is a sensitive measuring instrument for the weld depth s.

To this end the portion of the measuring laser beam 114 reflected by the surface of the workpiece 101 is deflected through approx. 90° via the second beam splitter 115 and passed to a sensor 112. Upstream of the sensor 112 is a filter 116 which is impervious to the wavelength of the welding laser 108 so that the sensor 112 does not respond to reflected radiation portions of the machining laser beam 109.

The sensor 112 generates an output signal which corresponds to the percentage portion of the measuring laser beam 114 reflected at the upper sheet 101 ie., the percentage portion of the measuring laser beam 114 that re-emerges from the vapour capillary 104. This output signal is conveyed to a comparator 117. The characteristic curve for the measuring laser 113 (corresponding to FIG. 2) which has already been determined experimentally is stored in a memory 118. It is connected to the second input of the comparator 117, the output signal of which is conveyed to the control unit of the machining laser 109.

The mode of operation of the device shown in FIG. 4 corresponds to that described above with the aid of FIG. 3. The only difference is that the signal used to re-adjust the weld depth s is the output signal of a separate measuring laser 113 and not the output signal of the machining laser 108. Otherwise the control processes take place as described above.

In the above description of the embodiments according to FIGS. 3 and 4 it was assumed that a complete, experimentally determined characteristic curve for the particular application has been stored in the memory 18 and/or 118. This makes it possible to preselect the weld depth at a control panel of the device, to input it direct in millimeters for example. This is particularly advantageous wherever the weld depth needs to be changed frequently. If, on a device, the weld depth remains constant over a fairly long period of time, however, a simplified control can be used: in this case a complete curve will not be stored in the memory 18 and/or 118 and used for comparison with the output signal of the sensor 12 and/or 112. Rather, in this case it is sufficient to specify a voltage that can be set by hand as the reference signal, which is compared with the output signal of the sensor 12 and/or 112 and whose value does not necessarily have to be quantitatively correlated to the weld depth S. The value of the pre-selectable voltage that is suitable for the workpiece in question and the other device and process parameters is simply determined experimentally, by determining the value of this pre-selectable reference signal which belongs to the correct weld depth s. The device then adjusts to this pre-set value and keeps the weld depth s constant in a corresponding manner.

Without further modification the devices described above and illustrated in FIGS. 3 and 4 can be used to re-melt a workpiece superficially, wherein a defined, pre-settable re-melt depth s is maintained. For this purpose the workpiece can be conveyed under the device on a meander-shaped path so that all surface regions are gradually melted open and re-melted.

With a slight modification to the logic of the control which is contained in the control units of the machining lasers 8 and/or 108, the devices according to FIGS. 3 and 4 can also be used to introduce holes with a certain depth s. In this case the workpiece is not displaced with respect to the device in the course of machining. At the start of the boring process the depth of the vapour capillary created by the machining laser beam 9 and/or 109 is still small, and so the percentage energy input is small and the reflected energy portion of the measuring laser beam 9 and/or 114 relatively high. The output signal of the sensor 12 and/or 112 of the devices of FIGS. 3 and 4 is therefore higher than a value stored in the memory 18 and/or 118 which corresponds to the desired value of the hole depth. With increasing penetration of the machining laser beam 9 and/or 109 into the workpiece the depth s of the vapour capillary becomes greater; the percentage energy input increases and the reflected energy portion of the measuring laser beam 9 and/or 114 decreases correspondingly. The output signal of the sensor 12 and/or 112 thus approaches the value stored in the memory 18 and/or 118 from above until it finally reaches it. The machining laser beam is interrupted at this moment; the workpiece can then be moved in such a way that the machining laser beam now impacts on another point at which the next hole is to be introduced.

What is claimed is:

1. Process for determining instantaneous penetration depth and achieving a desired penetration depth of a machining laser beam (9; 109) into a workpiece, comprising:

(a) determining in a preliminary trial the percentage portion of a measuring laser beam (9; 114) that re-emerges at the workpiece (1, 2; 101, 102) at the desired penetration depth;

(b) directing a laser beam (9; 114) performing the function of a measururing laser beam onto a vapour capillary (4; 104) formed in the workpiece (1, 2; 101, 102) by a laser beam (9; 109) performing the function of a machining laser beam, (c) determining a portion of the laser beam performing the function of a measuring laser beam that re-emerges from the vapour capillary (4; 104) within said workpiece, following multiple reflections within said workpiece, (d) in step (c) determining the percentage portion of the laser beam (9; 114) performing the function of a measuring laser beam that actually re-emerges at the workpiece (1, 2; 101, 102) and is not introduced into the workpiece (1, 2; 101, 102), and (e) determining energy introduced into the workpiece (1, 2; 101, 102) per unit of time and area by the laser beam (9; 109) performing the function of a machining laser beam as a function of said portion of the laser beam (9, 114) performing the function of a measuring laser beam that was determined in step (c).

2. Process according to claim 1, characterized in that the same laser (8) is used to generate the machining laser beam (9) and the measuring laser beam (9).

3. Process according to claim 1, characterized in that two different lasers (108, 113) are used to generate the machining laser beam (109) and the measuring laser beam (114), wherein the wavelength of the measuring laser beam (114) is greater than that of the machining laser beam (109).

4. Process according to claim 1, in which a hole with a certain depth is achieved in a workpiece, further comprising:

a) determining in a preliminary trial the percentage portion of the measuring laser beam (9; 113) that re-emerges at the workpiece (1, 2; 101, 102) at the desired penetration depth of the hole;

monitoring the percentage of the measuring laser beam (9; 114) continuously while the machining laser beam (9; 109) making the hole in the workpiece (1, 2; 101, 102) is stationary, and and interrupting the machining laser beam (9; 109) when the percentage portion of the measuring laser beam (9; 114) that re-emerges has reached a value determined in the preliminary trial.

5. Process according to one of claim 1, in which a workpiece is melted open to a certain depth or a weld introduced in a workpiece to a certain depth, characterized in that a) a preliminary trial determines the percentage portion of the measuring laser beam (9; 113) that is reflected at the workpiece (1, 2; 101, 102) at the desired depth (S) of the melt (5; 105);

b) the reflected percentage portion of the measuring laser beam (9; 114) is monitored continuously while the melt (5; 105) is being produced by the machining laser beam (9; 109) with a relative movement between machining laser beam (9; 109) and workpiece (1, 2; 101, 102) and deviations between the instantaneous reflected percentage portion of the measuring laser beam (9; 114) and the value determined in the preliminary trial are corrected by adjustment of the energy introduced into the workpiece (1, 2; 101, 102) by the machining laser beam (9; 109) per unit of time and area.

6. Process according to claim 5, characterized in that the adjustment is achieved by changing a power of the machining laser beam (9; 109).

7. Process according to claim 5, characterized in that the adjustment is undertaken by changing a relative speed between machining laser beam (9; 109) and workpiece (1, 2; 101, 102).

8. Process according to claim 5, characterized in that the adjustment takes place by de-focusing the machining laser beam (9, 109).

* * * * *